United States Patent
Chan et al.

(10) Patent No.: US 7,917,596 B2
(45) Date of Patent: Mar. 29, 2011

(54) SUPER MASTER

(75) Inventors: Wilson Chan, San Mateo, CA (US); Angelo Pruscino, Los Altos, CA (US); Michael Zoll, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 141 days.

(21) Appl. No.: 12/350,182

(22) Filed: Jan. 7, 2009

(65) Prior Publication Data

US 2010/0174802 A1    Jul. 8, 2010

(51) Int. Cl.
*G06F 15/16* (2006.01)
*G06F 12/00* (2006.01)
(52) U.S. Cl. ......................................... 709/208; 717/168
(58) Field of Classification Search .......... 709/208–211, 709/217–218, 250; 717/168
See application file for complete search history.

(56) References Cited

U.S. PATENT DOCUMENTS

| | | | |
|---|---|---|---|
| 7,702,741 B2* | 4/2010 | Yuan et al. | 709/208 |
| 2003/0128702 A1* | 7/2003 | Satoh et al. | 370/390 |
| 2006/0155802 A1* | 7/2006 | He et al. | 709/203 |
| 2007/0185872 A1* | 8/2007 | Ho et al. | 707/8 |
| 2009/0037553 A1* | 2/2009 | Yuan et al. | 709/209 |
| 2009/0313310 A1* | 12/2009 | Thome et al. | 707/203 |

OTHER PUBLICATIONS

Oracle9i Real Application Clusters Concepts, "Cache Fusion and the Global Cache Service" Release 1 (9.0.1), Part No. A89867-02, http://download.oracle.com/docs/cd/A91202_01/901_doc/rac.901/a89867/pslkgdtl.htm created Feb. 19, 2003, accessed Jun. 8, 2009.

* cited by examiner

*Primary Examiner* — Zarni Maung
(74) *Attorney, Agent, or Firm* — Hickman Palermo Truong & Becker LLP

(57) ABSTRACT

Described herein are techniques for using super masters to coordinate accesses by nodes in a database server cluster to data stored in a database. In many cases, the number of inter-nodal messages is reduced, thereby saving the overheads attendant to coordinating accesses in such a system.

24 Claims, 7 Drawing Sheets receive a first message from the first node to request a consistent read access to the first data block 302 in response to receiving the first message, send a second message to the first node 304

FIG. 3A receive a first message from the first node to request an exclusive access to the first data block 312 in response to receiving the first message, determine whether a holder node currently holds the exclusive access to the first data block 314 in response to determining that a holder node currently holds the exclusive access to the first data block, send a second message to the holder node, said second message identifying the first data block and the first node 316 receive a third message from the first node to inform that the first node has obtained the exclusive access to the first data block 318

FIG. 3B receive a second request to recover a second data block in the first set of data blocks 322 determine whether the second version is more recently committed than the first version 324 in response to determining that the second version is more recently committed than the first version, apply one or more changes for the second data block 326 in response to determining that the second version is no more recently committed than the first version, take no recovery action with respect to the second data block 328

FIG. 3C

```
┌─────────────────────────────────┐
│  send a request from a master node │
│   to a holder node to cause a copy │
│    of the current version of a shared │
│     data resource to be sent to a  │
│       requesting node and said     │
│          master  node 332          │
└─────────────────────────────────┘
                 │
┌─────────────────────────────────┐
│    said master node receives said  │
│   copy of the current version of the │
│  data block from the holder node 334 │
└─────────────────────────────────┘
```

FIG. 3D

SUPER MASTER

FIELD OF THE INVENTION

The present invention relates to accessing data stored persistently in computer systems, and in particular, to efficiently retrieving data from a shared persistent storage by nodes in a multi-node system.

BACKGROUND OF THE INVENTION

In a multi-node system, nodes often compete for "shared data resources," such as for example, data blocks in a database. A shared data resource may be concurrently accessed by a number of nodes if accesses by the nodes are compatible. A shared data resource may be blocked from being accessed by a node if the access sought by the node is incompatible with existing accesses that have already been granted to other nodes. Various mechanisms have been developed to coordinate access to shared data resources.

According to one mechanism, access to shared data resources is based on the usage of a fusion protocol. In such a scheme, three nodes may be involved in accessing a shared data resource. For each shared data resource, there is a master (node) that keeps track of which nodes have been granted access and which nodes are waiting for a lock in order to access the shared data resource. For each shared data resource, there is at most one holder (node) who holds an exclusive lock. Node 3, for example, may hold an exclusive lock to a shared data resource in the form of a data block. Node 1 may send a request to the master, indicating a wish to access the data block with an exclusive lock. Determining that node 3 is holding the exclusive lock, the master node informs node 3 of node 1's request for accessing the data block. After node 3 is done with the data block, node 3 ships the data block to node 1. Upon receiving the data block from the node 1, node 3 informs the master that it now owns the data block. This form of 3-way messaging, which involves many internodal messages between three different nodes, can occur frequently in a multi-node system.

Therefore, techniques are needed to reduce overhead of accessing shared data resources in a multi-node system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A and FIG. 3B are examples of processing flow for processing access request from a node according to an embodiment of the present invention;

FIG. 3C is an example of processing flow for recovering a data block after a node fails according to an embodiment of the present invention;

FIG. 3D is an example of processing flow for updating a super master by a holder node according to an embodiment of the present invention.

DETAILED DESCRIPTION OF THE INVENTION

Techniques for using super masters to coordinate access by nodes in a database server cluster to data in a database are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
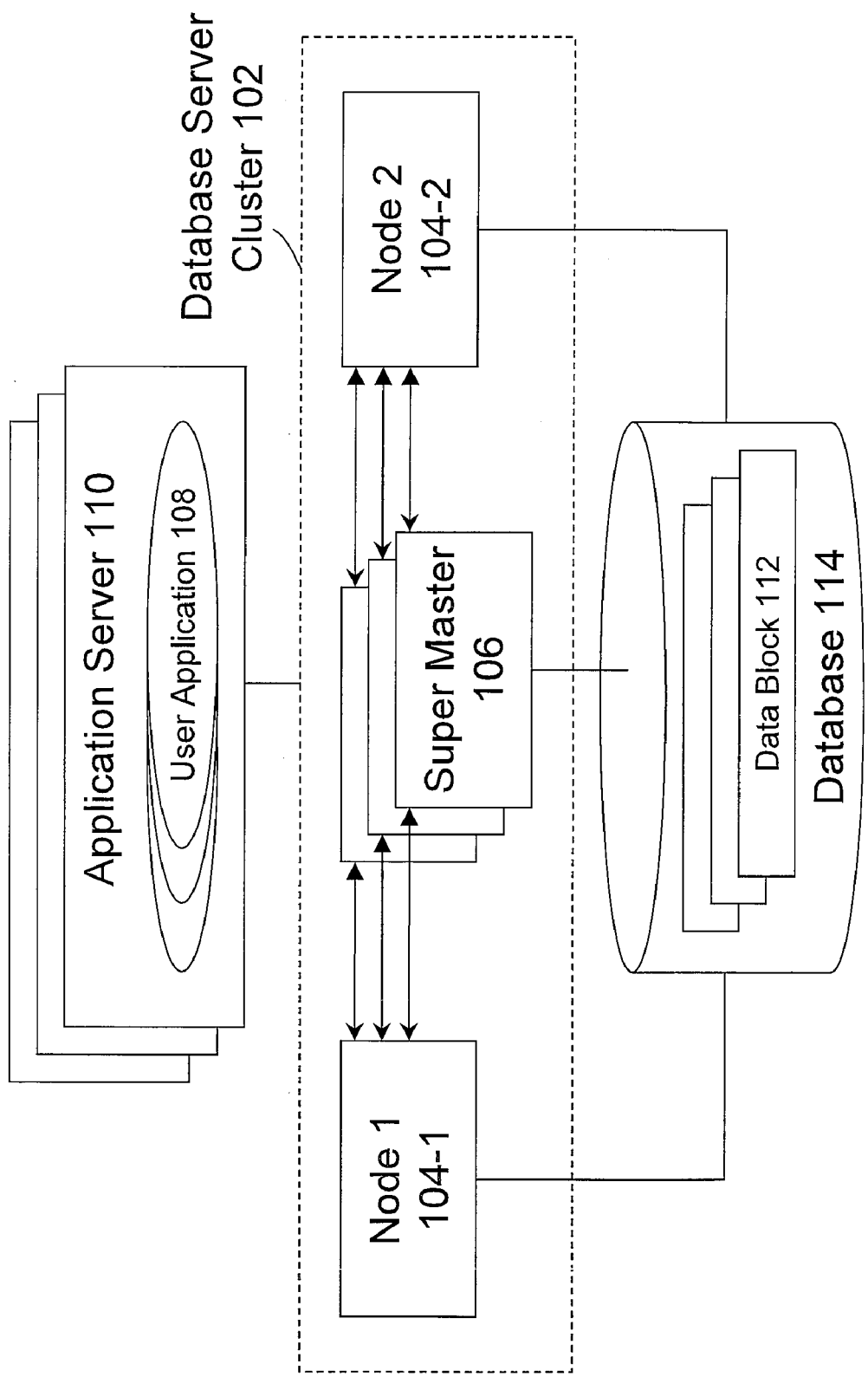
FIG. 1 illustrates an example system that comprises an example database server cluster according to an embodiment of the present invention.

According to an embodiment of the present invention, as illustrated in FIG. 1, the techniques may be performed by a database server cluster 102, which comprises multiple interconnected nodes (104 and 106) that manage database accesses by user applications (108), which may be located on application servers (110) outside the database server cluster 102, to data (such as data blocks 112) stored in a database (114). The nodes (104 and 106) in the database server cluster 102 may be in the form of computers (e.g. work stations, personal computers) interconnected via a network. Alternatively, the nodes may be nodes of a grid, where each node is interconnected on a rack. The grid may host multiple database server clusters. Each node may be a separate physical computer, or a separate domain (running inside a virtual machine) among a plurality of domains that partition a physical computer. In embodiments where some of the nodes may be domains, each domain behaves independently like a separate physical computer and constitutes a separate logical computer.

The database comprises (shared) data and metadata stored on a persistent memory mechanism, such as a set of hard disks. The data and metadata may be stored, for example, according to relational and/or object-relational database constructs.

One or more database servers may be deployed in the nodes. User applications interact with a database server by submitting database commands which cause the database server to perform operations on the data (or a portion thereof) stored in a database. A database command may be given in one or more database statements. The database statements may conform to a database language supported by the database server. A non-limiting database language supported by many database servers is SQL, including proprietary forms of SQL supported by such database servers as Oracle, (e.g. Oracle Database 10g).

A data block is an atomic unit of persistent storage used by a DBMS to store database records (e.g. rows of a table). When a row needs to be accessed from persistent storage, the entire data block containing the row is be copied into a data block buffer in volatile memory of a database server. A data block usually contains multiple rows, and control and formatting information, e.g. (offsets to sequences of bytes representing rows or other data structures, list of transactions affecting a row, a system change number (SCN) of a recent change to the data block).

As used herein, an SCN is a logical number assigned to transactions in commit time order. Each change is associated with the SCN of the transaction that performed the change.

The SCN associated with a change indicates the logical time at which the change was made within the database.

Buffer Cache

Under new techniques described herein, one or more nodes (106) in the database server cluster will be configured as super masters. A node (106) that has been configured as a super master has a buffer cache to store a copy of shared data resources that are assigned to the super master. The super master may provide a copy of an image of the shared data source stored in its buffer cache to other (requesting) nodes in some situations. The super master is configured to coordinate access by any of all nodes in the database server cluster to a shared data resource that is assigned to the super master, whether the shared data resource will be furnished out of its buffer cache or furnished by a different node in the database server cluster.

An embodiment of present invention is illustrated in the context of multi-node database system, where the shared data resources are data blocks. However, an embodiment of the present invention is not limited to such database systems, or database systems in general.

A lock mechanism may be used by a super master to coordinate access, by nodes in a cluster, to data blocks assigned to the super master. An exclusive lock may be issued to allow a node to perform any read/write access, while a consistent read lock may be issued to allow a node to perform read-only access. As used herein, a consistent read is designed to provide data from the database that reflects the state of the database up to a time which, for example, may be logically represented by an SCN.

For the purpose of this invention, other types of locks or other types of granularities of locks may also be used, so long as all compatible accesses to a data block can be ensured and all issued locks and all pending lock requests for which a super master is responsible can be tracked by the super master.

A particular data block may have been assigned to a super master to coordinate access by the nodes in the cluster to the particular data block. The super master may use a queue, referred to as a grantor queue, to keep track of all locks that are granted and are in effect for the data block. At the same time, the super master may also use a second queue, referred to as a convert queue, to keep track of all unfulfilled lock requests that are waiting for a lock to access the data block.

The buffer cache on the super master (106) stores the current version of the data block except for a brief transient period in which a committed change made by a different node (104 or 106) has yet to reach the super master (106). When this different node commits its change to the data block, an updated image of the data block will be provided to the super master (106). Thus, the super master (106) will have, in effect, either the current version or the last version of the data block. The image of the data block stored in the buffer cache may be associated with an SCN that was issued when the image was committed in the database. In some embodiments, the database system issues new SCNs in an ascending order. Therefore, the buffer cache on the super master will have an image of the data block that has either the highest or second highest SCN associated with the data block.

For the purpose of brevity, a data block may refer to an image of the data block in a buffer cache of a super master, which image may correspond to a version of the data block that has been most recently committed in the database.

Directly Serving Data Blocks for Compatible Accesses

When a (requesting) node needs a data block, the requesting node will send a request to a super master. This data block may not first exist in the buffer cache (which is volatile memory in some embodiments) of the super master. For example, this may be a first-time access for a period of time by any node in the cluster to the data block. In response to the request, the super master may retrieve the current image (i.e., the most recently committed image) of the data block from a persistent store of the database. Once retrieved, the super master may send a copy of this image to the requesting node and stores this copy of the data block in the buffer cache.

When a different requesting node requests the same data block while the previous requesting node still holds the data block, the super master may directly provide the data block from its buffer cache to the other requesting node, so long as all outstanding types of accesses by all requesting nodes (or all granted locks) are compatible. In providing the data block in this way, the super master does not first retrieve the data block from the previous requesting node. This new approach reduces the number of 3-way messages because a requesting node may not have to get a data block from a third-party holder node. Rather, many accesses such as consistent reads can be directly granted by a super master and data blocks can be served out of the super master in 2-way messaging involving only the super master and the requesting nodes.

For example, a requesting node may not need the most current version of a data block. The requesting node may start a transaction with a consistent read at SCN5 (i.e., SCN=5). The holder node may be updating the data block at SCN6. The master still has the past image of the data block at SCN5 and can serve the request directly. In this way, the request by the requesting node does not have to be fulfilled by the holder node.

Obtaining a Current Version from a Holder Node

If a requesting node wants the current version of the data block and if a super master only has a version that is earlier than the current version, the request is handled in a modified fusion protocol involving the requesting node, the super master and a holder node that has the current version. For example, the requesting node may want to have an exclusive lock to update the current version of the data block. The master will send a message (such as BAST—Blocking Asynchronous System Trap) to the holder node to indicate that the holder node is holding the data block and the requesting node wants the data block. In some embodiments, the holder node does not release a data block such as the one requested by the requesting node until the holder node is asked to (e.g., by a BAST). It is up to the holder node to determine whether to continue holding the data block in its buffer cache or relinquish the data block. At a point of time when the holder node determines to relinquish the data block to the requesting node, a copy of the data block is sent to both the requesting node and the super master. In one embodiment, sending the data block to the requesting node and sending the same to the super master occurs concurrently. In an alternative embodiment, the data block may be first sent to the super master, which in turn forwards the data block to the requesting node. When the data block is relinquished by the holder node to the requesting node, the super master will obtain and store the current version of the data block in its buffer cache.

Recovering Lost Changes when a Node is Down

When a node goes down, even though changes to a number of data blocks by this failed node are supposed to be committed in the database, these changes may not actually be made to the database. In this situation, when a super master discovers the failure of the node (e.g., through a certain clusterware layer that coordinates nodes in the database server cluster), the super master can perform the recovery for any affected data blocks that are assigned to the super master for access coordination.

In some approaches, a master would have to ask many other nodes that are currently holding the affected data blocks to perform recovery. However, under new techniques described herein, the super master may check the buffer cache and determine whether suitable versions of some of the affected data blocks can be found there. If so, no further action is performed. Only if the buffer cache on the super master does not have a suitable version for a data block, does the super master need to locate a version from the database or from another node, so that changes from redo logs of the failed node to that data block can be applied. As used in this discussion, a suitable version refers to a version of an affected data block which version is no earlier than a particular version of the affected data block as if the particular version had just applied the changes in the redo logs of the failed node, but otherwise applied no other changes.

For example, when a node fails, its redo logs may indicate that data blocks 1, 5, 6 and 7 have been changed. Some of the data blocks indicated may currently be held by some other nodes that are running the database server cluster. Instead of asking these other nodes to recover their holding blocks that are affected by the failed node, the super master will check its buffer cache for data blocks 1, 5, 6 and 7, including any data block that currently is held by another node. For example, the redo logs indicate that after changes on the failed node are applied to data block 1, data block 1 should have an SCN5. If the super master discovers that its buffer cache has a suitable version of data block 1 with an SCN5 or later, then no recovery of the changes on the failed node to data block 1 is necessary. This is true even if another node currently is holding data block 1 with an exclusive lock.

On the other hand, if the super master determines that its buffer cache only has a version of data block 1 with an SCN4, then the super master may determine whether any node currently is holding data block 1. If so, the super master may request the holder node to apply the changes in the redo logs. Otherwise, if there is no node currently holding data block 1, the super master will apply the changes in the redo logs to data block 1 to produce a version of data block 1 with an SCN5.

In this new approach, the super master has already had most of the data blocks in its buffer cache. No requests to other nodes are needed for many affected data blocks. Whichever super master that is assigned to coordinate access to an affected data block will be responsible for recovering the affected data block by applying the changes in the redo log. If only one super master is responsible for all data blocks, it will be responsible for recovering all the data blocks.

Configuring Super Masters

Super masters may be specially configured for their role. For example, super masters may be interconnected with a faster (closely coupled environment) network so that they may share and/or move data blocks quickly. In addition, super masters may be protected more than non-super master nodes to ensure high availability of super masters available. Super masters may be configured to run special processes that are involved in performing access coordination among all nodes of the cluster. In some embodiments, some database server processes may be deployed on a super master to interact with user applications. In some other embodiments, super masters do not directly interact with user applications outside the database server cluster.

Re-Mastering

Under new techniques described herein, all, or a portion, of data blocks in the database may be partitioned so that each super master is responsible for coordinating access to a different set of data blocks. Buffer cache accesses can be tracked by statistical information collected by the super masters.

Based on the statistic information, the partitioning of the data blocks can be adjusted and optimized. For example, since all the buffer cache accesses are known, the super masters can detect that only node 1 accesses a particular table. Accordingly, all data blocks associated with this particular table may be moved to a super master that has a relatively small number of communication hops from and to node 1. In some embodiments, the super master is directly linked to node 1. Node 1 only needs to talk to this super master for accessing the particular table. In other words, the mastership of a data block may be transferred from one super master to a different super master in a re-mastering operation. In some embodiments, re-mastering of a data block can occur even if there are two or more nodes that access the data block, so long as one of the two or more nodes access the data block more frequently than other nodes.

In an alternative embodiment, data blocks may be managed by a non-super master node bypassing the super master mechanism, if such data blocks are accessed more frequently by the non-super master node than other nodes.

Additionally and/or alternatively, a non-super master node may be promoted to a super master.

Partitioning Data Blocks

A super master may read or write data blocks. For example, a checkpoint may be issued to call for writing changes with an SCN9 to a persistent store of the database. A super master that has a data block with this SCN or less may commit the data block to a persistent store of the database. The writing of data blocks to persistent store of the database can also occur if a buffer cache on a super master needs space to read new data blocks. A least recently used (LRU) algorithm may be used to free up space occupied by the least recently used blocks. In some embodiments, until a checkpoint occurs or a buffer cache on a super master runs out of space, data blocks may be held in the buffer cache without writing them to the persistent store.

Example Process

Figure 2:
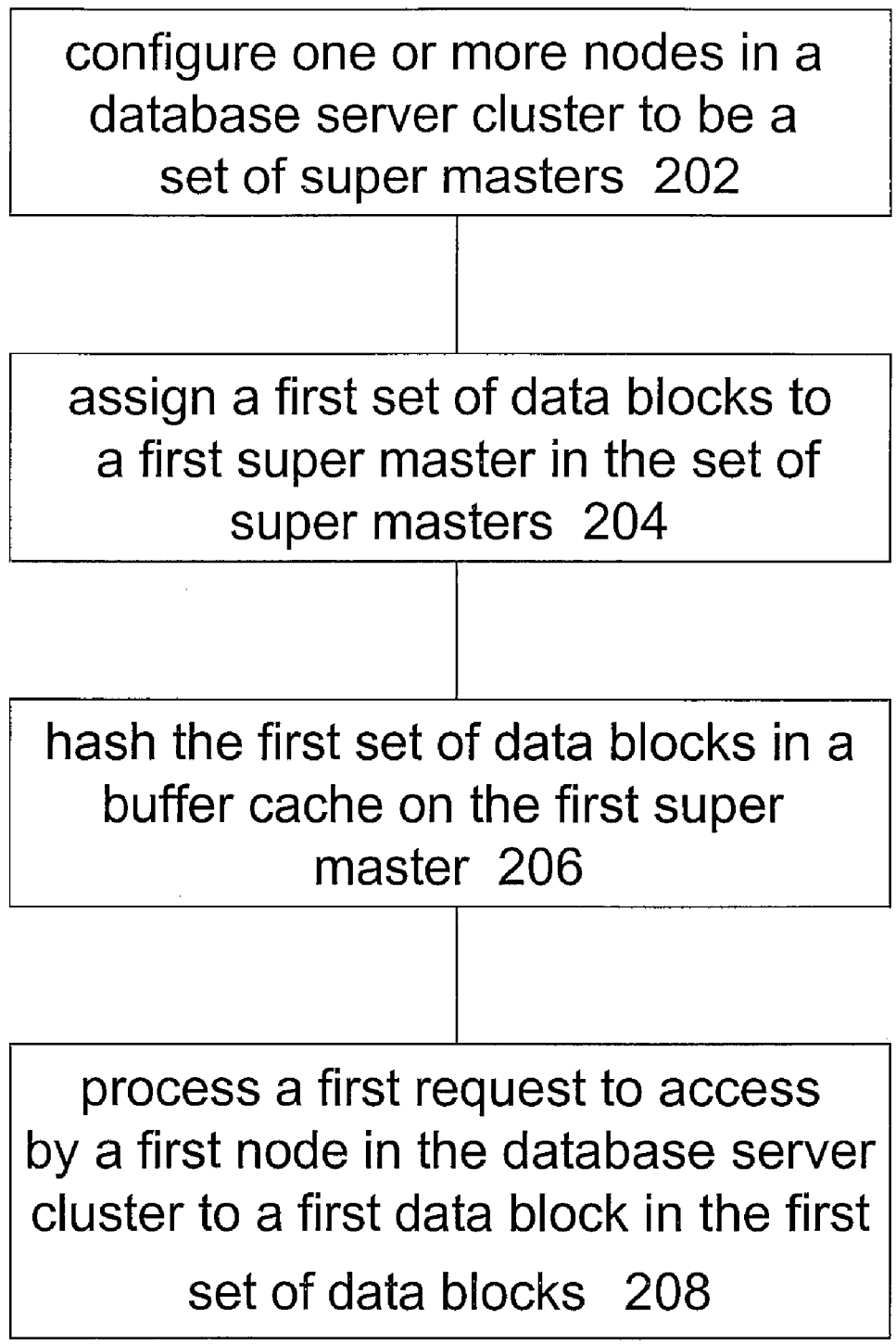
FIG. 2 is an example process for coordinating access by nodes in a database server cluster using super masters according to an embodiment of the present invention.

FIG. 2 illustrates an example process under new techniques described herein. In block 202, the database server cluster configures one or more nodes therein to be a set of super masters. As illustrated in FIG. 1, the database server cluster 102 manages accesses by user applications 108 to database 114.

In block 204, the database server cluster assigns a first set of data blocks to a first super master in the set of super masters. The first super master will coordinate access by any of all nodes in the database server cluster to the first set of data blocks. The first set of data blocks may be a portion, or all, of the data stored in the database. Here, a direct physical access path may exist between the database and any node in the database server cluster without needing to go through other nodes in the database server cluster. Thus, even though a non-super master node may have a direct access to the data in the database, access to the data (such as who has the exclusive lock to change a data block) is coordinated and granted through a super master. Once access to a data block is granted, a node may perform permissible access actions with the data block.

In block 206, the first super master stores a copy of the first set of data blocks in its buffer cache. The caching of the data blocks in the buffer cache may be continuously performed over time.

In block 208, the first super master processes a first request to access a first data block. This first request is made by a first node in the database server cluster. Here, the first node may be different from the first super master. It is possible that because some prior accesses to the first data block have already been made, the buffer cache on the first super master has a copy of a version of the first data block. This version may correspond to an image of the first data block, which image has been most recently committed in the database for the first data block. In some embodiments, this version corresponds to a highest system change number that has been issued to the first data block.

FIG. 3A illustrates a first example process flow that may be used to process a first request by a first node in the database server cluster, as referenced above in block 208 of FIG. 2. In block 302, the first super master receives a first message from the first node to request a consistent read access to the first data block. In block 304, in response to receiving the first message, the first super master sends a second message to the first node. This second message contains a copy of the first data block from the buffer cache of the first super master.

FIG. 3B illustrates a second example process flow that may be used to process a first request by a first node in the database server cluster, as referenced above in block 208 of FIG. 2. In block 312, the first super master receives a first message from the first node to request an exclusive access to the first data block. In block 314, in response to receiving the first message, the first super master determines whether a holder node currently holds the exclusive access to the first data block. In block 316, in response to determining that a holder node currently holds the exclusive access to the first data block, the first super master sends a second message to the holder node, said second message identifying the first data block and the first node. This second message causes the holder node to transfer a copy of the first data block to the first node. In block 318, the first super master receives a third message from the first node to inform that the first node has obtained the exclusive access to the first data block. This third message may be sent by the first node after the first node obtains the first data block transferred from the holder node.

Alternatively, when performing the determination referenced in block 314 of FIG. 3B, the first super master, may determine that no holder node currently holds the exclusive access to the first data block. In response to this determination, the first super master sends a second message to the first node. This second message contains a copy of the first data block from the buffer cache of the first super master.

In some embodiments, the first super master may not only coordinate access by any node in the database server cluster to the first data block, but also may write the first data block to at least one of disks that store the data in the database, when an event occurs. Such an event may be that a checkpoint has occurred, or that usage of the buffer cache has reached a threshold. When the usage crosses the threshold, the first super master may write dirty data blocks to the persistent store of the database. The dirty data blocks may be selected using a least recently used algorithm.

FIG. 3C illustrates a third example process flow that may be used to recover a data block after a node failed. For the purpose of illustration only, in block 322, the first super master receives a second request to recover a second data block in the first set of data blocks. While the second data block in the buffer cache of the first super master is of a first version, the second request identifies a second version that should have been committed for the second data block. This second version perhaps is indicated in redo logs that were maintained by the failed node. In block 324, the first super master determines whether the second version is more recently committed than the first version. In block 326, in response to determining that the second version is more recently committed than the first version, the first super master retrieves one or more changes stored in the redo logs and applies the one or more changes for the second data block. As a result, now the buffer cache on the first super master contains a second version of the second data block.

Alternatively, in response to determining that the second version is no more recently committed than the first version, the first master node, or any other node in the database server cluster, takes no recovery action with respect to the second data block.

As noted, each node in the database server cluster may be a separate physical computer, or may be either a separate physical computer or a separate domain of a physical computer. In some embodiments, capabilities configured for the first super master are different from capabilities configured for a node in the database server cluster that is not a member of the set of super masters. In some embodiments, to ensure high availability or fault tolerance of the first super master, the first super master may be configured with a backup super master that readily takes over when the first super master fails.

A super master such as the first super master may maintain statistics information for accesses to data blocks by all nodes in the database server cluster. Based on the statistics information, the set of super master may re-master a portion of data blocks, transferring one or more data blocks in the first set of data blocks to a second super master so that the second super master will coordinate access by any of all nodes in the database server cluster to the one or more data blocks transferred from the first super master.

In some embodiments, the first super master may transfer one or more data blocks in the first set of data blocks to a particular node in the database server cluster that is not a member of the set of super masters so that the particular node will coordinate access by any of all nodes in the database server cluster to the one or more data blocks.

FIG. 3D illustrates a third example process flow that may be used to update a master node by a holder node. For the purpose of illustration only, in block 332, a master node sends a request to a holder node. This request causes the holder node to send a current version of the data block to a requesting node. In block 334, a master node receives a copy of the current version of the data block from the holder node. Here, the master node coordinates access to the data block by one or more nodes in a database server cluster. The database server cluster in turn manages accesses by user applications to a database that stores a committed version of the data block.

For the purpose of illustration, it has been described that a super master or a master node performs in connection with other nodes a number of illustrated steps in the example process flows. However, it should be noted that a super master or a master node is not required to perform all of the illustrated steps. In some embodiments, a super master or a master node may perform any, some, or all of the steps illustrated in the example process flows.

Hardware Overview

Figure 4:
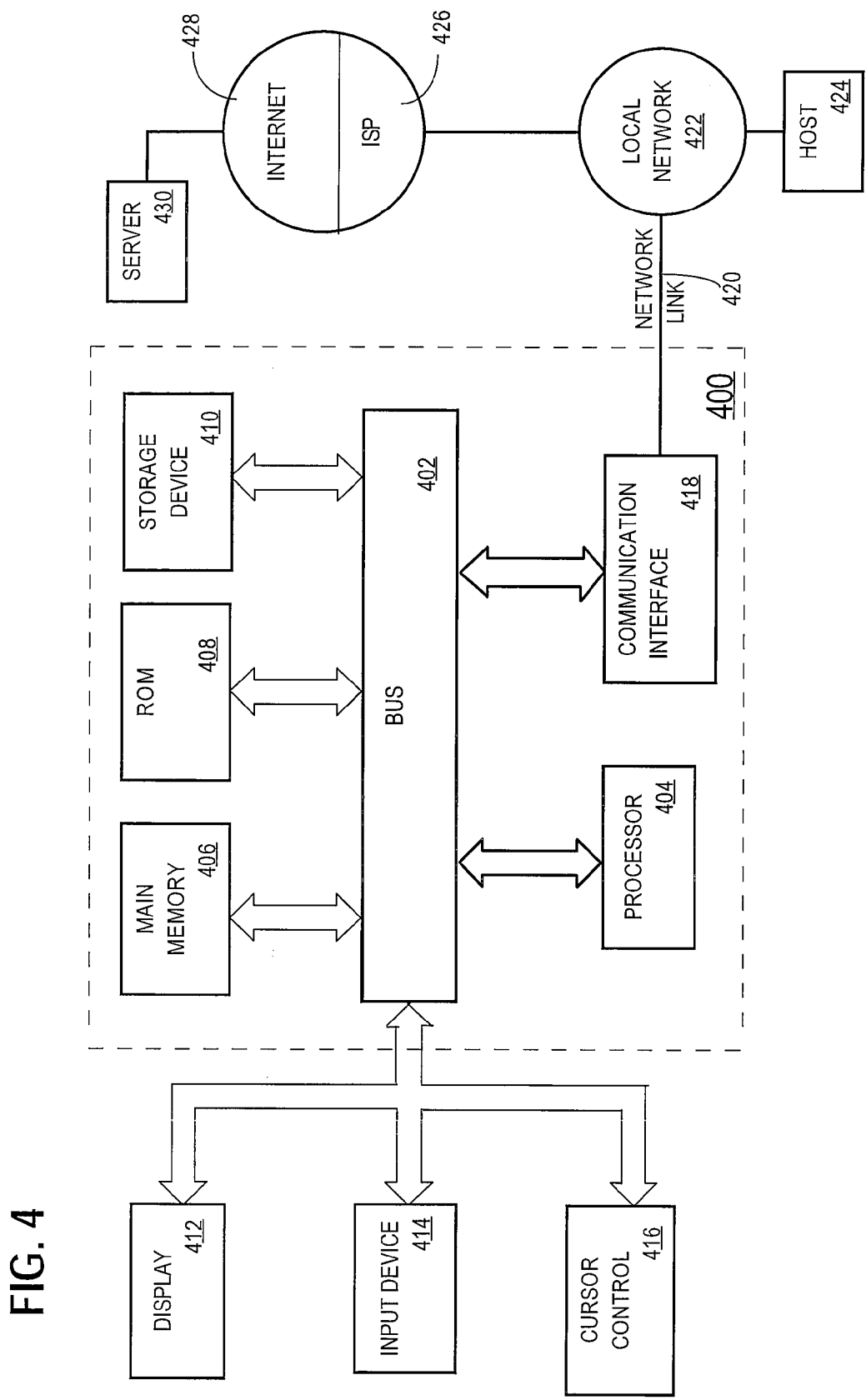
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    sending a request from a master node to a holder node, wherein the request causes the holder node to send a copy of a current version of a shared data resource to a requesting node and the master node; and
    said master receiving said copy of the current version of a shared data resource from the holder node;
    wherein the master node coordinates access to the shared data resource by one or more nodes in a multi-node system;
    wherein the method is performed by one or more computing devices.

2. The method of claim 1, wherein the holder node holds an exclusive lock to the shared data resource before the holder node sends the current version of the shared data resource to the requesting node.

3. The method of claim 1, wherein the master node caches the copy of the current version of the shared data resource.

4. The method of claim 1, wherein the holder node, the master node, and the requesting node are all different nodes in the multi-node system.

5. The method of claim 1, wherein a direct physical access path exists between the database and any node in the multi-node system.

6. The method of claim 1, wherein said current version of the shared data resource replaces a committed version of the shared data resource in the database.

7. The method of claim 1, further comprising:
receiving a message from a second requesting node to request a consistent read access to the shared data resource;
in response to receiving the message from the second requesting node, said master node sending a second message containing a copy of the shared data resource stored on the master node.

8. The method of claim 1, further comprising:
receiving a message from the requesting node to request an exclusive access to the shared data resource;
in response to receiving the message, determining that the holder node currently holds the exclusive access to the shared data resource; and
in response to determining that the holder node currently holds the exclusive access to the shared data resource, sending a second message to the holder node, said second message identifying the request, the shared data resource and the requesting node.

9. The method of claim 1, further comprising:
receiving a second request to recover a second shared data resource a copy of which is stored on the master node, wherein the copy of the second shared data resource on the master node is of a first version and wherein the second request identifies a second version that should have been committed for the second shared data resource;
determining whether the second version is more recently committed than the first version; and
in response to determining that the second version is more recently committed than the first version, applying one or more changes for the second shared data resource, wherein the one or more changes are stored in one or more redo logs.

10. The method of claim 1, further comprising transferring one or more shared data resources on the master node to a second master node so that the second master node will coordinate access by any of all nodes in the multi-node system to the one or more shared data resources.

11. A non-transitory computer-readable storage medium storing one or more sequences of instructions which, when executed by one or more processors, causes the one or more processors to perform:
sending a request from a master node to a holder node, wherein the request causes the holder node to send a copy of a current version of a shared data resource to a requesting node and the master node; and
said master receiving said copy of the current version of the shared data resource from the holder node;
wherein the master node coordinates access to the shared data resource by one or more nodes in a multi-node system and wherein the multi-node system manages accesses by user applications to a database that stores a committed version of the shared data resource.

12. The medium of claim 11, wherein the holder node holds an exclusive lock to the shared data resource before the holder node sends the current version of the shared data resource to the requesting node.

13. The medium of claim 11, wherein the master node caches the copy of the current version of the shared data resource.

14. The medium of claim 11, wherein the holder node, the master node, and the requesting node are all different nodes in the multi-node system.

15. The medium of claim 11, wherein a direct physical access path exists between the database and any node in the multi-node system.

16. The medium of claim 11, wherein said current version of the shared data resource replaces a committed version of the shared data resource in the database.

17. The medium of claim 11, wherein the one or more sequences of instructions further comprise instructions which, when executed by one or more processors, causes the one or more processors to perform:
receiving a message from a second requesting node to request a consistent read access to the shared data resource;
in response to receiving the message from the second requesting node, said master node sending a second message containing a copy of the shared data resource stored on the master node.

18. The medium of claim 11, further comprising:
receiving a message from the requesting node to request an exclusive access to the shared data resource;
in response to receiving the message, determining that the holder node currently holds the exclusive access to the shared data resource; and
in response to determining that the holder node currently holds the exclusive access to the shared data resource, sending a second message to the holder node, said second message identifying the request, the shared data resource and the requesting node.

19. The medium of claim 11, wherein the one or more sequences of instructions further comprise instructions which, when executed by one or more processors, causes the one or more processors to perform:
receiving a second request to recover a second shared data resource a copy of which is stored on the master node, wherein the copy of the second shared data resource on the master node is of a first version and wherein the second request identifies a second version that should have been committed for the second shared data resource;
determining whether the second version is more recently committed than the first version; and
in response to determining that the second version is more recently committed than the first version, applying one or more changes for the second shared data resource, wherein the one or more changes are stored in one or more redo logs.

20. The medium of claim 11, wherein the one or more sequences of instructions further comprise instructions which, when executed by one or more processors, causes the one or more processors to perform transferring one or more shared data resources on the master node to a second master node so that the second master node will coordinate access by any of all nodes in the multi-node system to the one or more shared data resources.

21. An apparatus comprising:
one or more processors; and one or more sequences of instructions which, when executed by the one or more processors, causes the one or more processors to perform:
    sending a request from a master node to a holder node, wherein the request causes the holder node to send a current version of a shared data resource to a requesting node; and
    receiving by a master node a copy of the current version of the shared data resource from the holder node;
    wherein the master node coordinates access to the shared data resource by one or more nodes in a multi-node system and wherein the multi-node system manages accesses by user applications to a database that stores a committed version of the shared data resource.

22. The apparatus of claim 21, wherein the one or more sequences of instructions further comprise instructions which, when executed by one or more processors, causes the one or more processors to perform:
    receiving a message from a second requesting node to request a consistent read access to a second shared data resource;
    in response to receiving the message from the second requesting node, sending by the master node a second message a copy of the second shared data resource stored on the master node.

23. The apparatus of claim 21, wherein the one or more sequences of instructions further comprise instructions which, when executed by one or more processors, causes the one or more processors to perform:
    receiving a message from the requesting node to request an exclusive access to the shared data resource;
    in response to receiving the message, determining that the holder node currently holds the exclusive access to the shared data resource; and
    in response to determining that the holder node currently holds the exclusive access to the shared data resource, sending a second message to the holder node, said second message identifying the request, the shared data resource and the requesting node.

24. The apparatus of claim 21, wherein the one or more sequences of instructions further comprise instructions which, when executed by one or more processors, causes the one or more processors to perform:
    receiving a second request to recover a second shared data resource a copy of which is stored on the master node, wherein the copy of the second shared data resource on the master node is of a first version and wherein the second request identifies a second version that should have been committed for the second shared data resource;
    determining whether the second version is more recently committed than the first version; and
    in response to determining that the second version is more recently committed than the first version, applying one or more changes for the second shared data resource, wherein the one or more changes are stored in one or more redo logs.

* * * * *

UNITED STATES PATENT AND TRADEMARK OFFICE
CERTIFICATE OF CORRECTION

| | | |
|---|---|---|
| PATENT NO. | : 7,917,596 B2 | Page 1 of 1 |
| APPLICATION NO. | : 12/350182 | |
| DATED | : March 29, 2011 | |
| INVENTOR(S) | : Chan et al. | |

It is certified that error appears in the above-identified patent and that said Letters Patent is hereby corrected as shown below:

In column 10, line 57, in Claim 1, delete "of a" and insert -- of the --, therefor.

Signed and Sealed this
Fourth Day of October, 2011

David J. Kappos
*Director of the United States Patent and Trademark Office*